US010122666B2

(12) United States Patent
Bostick et al.

(10) Patent No.: US 10,122,666 B2
(45) Date of Patent: Nov. 6, 2018

(54) RETRIEVING AND REUSING STORED MESSAGE CONTENT

(71) Applicant: International Business Machines Corporation, Armonk, NY (US)

(72) Inventors: James E. Bostick, Cedar Park, TX (US); John M. Ganci, Jr., Cary, NC (US); Stephen G. Meyer, Chicago, IL (US); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 14/204,313

(22) Filed: Mar. 11, 2014

(65) Prior Publication Data
US 2015/0264003 A1  Sep. 17, 2015

(51) Int. Cl.
*G06F 15/16* (2006.01)
*H04L 12/58* (2006.01)

(52) U.S. Cl.
CPC .............. *H04L 51/22* (2013.01); *H04L 51/08* (2013.01)

(58) Field of Classification Search
CPC ... H04L 51/22; H04L 51/08; G06F 17/30887; Y10S 707/99931
See application file for complete search history.

(56) References Cited

U.S. PATENT DOCUMENTS

| | | | | |
|---|---|---|---|---|
| 8,286,085 B1* | 10/2012 | Denise | ................. | G06Q 10/107 707/705 |
| 9,600,769 B1* | 3/2017 | Liu | ........................ | G06N 5/02 |
| 2004/0019611 A1* | 1/2004 | Pearse | ............... | G06F 17/30887 |
| 2004/0153517 A1* | 8/2004 | Gang | .................. | G06Q 10/107 709/206 |
| 2005/0144245 A1* | 6/2005 | Lowe | .................. | H04L 12/5855 709/206 |
| 2005/0182765 A1* | 8/2005 | Liddy | ............... | G06F 17/30699 |
| 2005/0188019 A1* | 8/2005 | Mittelstaedt | ......... | G06Q 10/107 709/206 |
| 2006/0025091 A1* | 2/2006 | Buford | .................. | H04L 51/063 455/154.2 |
| 2007/0011608 A1* | 1/2007 | Titemore | ............ | G06F 17/2229 715/209 |

(Continued)

FOREIGN PATENT DOCUMENTS

| | | |
|---|---|---|
| WO | 2002059774 A1 | 8/2002 |
| WO | 2004075027 A2 | 9/2004 |
| WO | 2012047934 A1 | 4/2012 |

OTHER PUBLICATIONS

Makar, R. et al.; "Cataloging WebSphere MQ Applications in WSDL for Reuse in SOA"; IBM Corporation, http://www.ibm.com/redbooks/redp4350-00 . . . ; 2008.

(Continued)

*Primary Examiner* — Cheikh Ndiaye
(74) *Attorney, Agent, or Firm* — Christopher K. McLane; Alexander G. Jochym

(57) ABSTRACT

In an approach to storing message content, one or more computer processors receive a selection of message content. The one or more computer processors receive a selection of a category associated with the selected message content. The one or more computer processors store the selected message content associated with the selected category.

17 Claims, 3 Drawing Sheets

(56) References Cited

U.S. PATENT DOCUMENTS

| | | | |
|---|---|---|---|
| 2007/0043824 A1* | 2/2007 | Fremantle | H04L 67/26 709/214 |
| 2007/0094329 A1* | 4/2007 | Cameron | G06Q 10/107 709/204 |
| 2007/0112742 A1 | 5/2007 | Dumais et al. | |
| 2008/0184138 A1 | 7/2008 | Krzanowski et al. | |
| 2009/0055481 A1* | 2/2009 | Carmel | G06Q 10/107 709/206 |
| 2010/0100370 A1* | 4/2010 | Khouri | H04L 12/58 704/9 |
| 2010/0145940 A1* | 6/2010 | Chen | G06F 17/30864 707/736 |
| 2011/0093455 A1* | 4/2011 | Benyamin | H04L 12/58 707/723 |

OTHER PUBLICATIONS

Yang, Y. et al.; "Text categorization"; Scholarpedia, 3(5):4242, http://www.scholarpedia.org/article/Text_categorization; 2008.

* cited by examiner

RETRIEVING AND REUSING STORED MESSAGE CONTENT

FIELD OF THE INVENTION

The present invention relates generally to the field of electronic messaging, and more particularly to retrieving and reusing stored message content.

BACKGROUND

There are many different types of electronic text based messaging. Electronic mail, e.g., email, is a store-and-forward method of writing, sending, receiving and saving messages that has become ubiquitous in today's society, used for both personal and business applications. Email is a system based on the Simple Mail Transfer Protocol (SMTP) that can be used in a distributed computing environment over many different platforms and network systems. Real-time messaging systems, such as instant messaging, text messaging, and chat sessions, have gained tremendous popularity in recent years. In these systems, users communicate with one another in real time by exchanging messages over a network, such as the public Internet, a private intranet, or a cellular network. Interactive chat sessions may be accessed using a number of devices, including laptop computers, web-enabled cellular telephones, and so forth.

A snippet is a programming term for a small region or portion of re-usable source code, machine code, or text; however the term may also apply to an information selection including text, graphics, video, or a combination of the three. A computer user may copy a snippet of information, for example, from a document or web page to paste into an electronic message.

SUMMARY

Embodiments of the present invention disclose a method, computer program product, and system for storing message content. The method includes one or more computer processors receiving a selection of message content. The one or more computer processors receive a selection of a category associated with the selected message content. The one or more computer processors store the selected message content associated with the selected category.

DETAILED DESCRIPTION

Typically, received electronic and text based messages, if saved, are saved in full. Retrieving key information from a message may be a tedious process. Users may have to scroll through the history of received messages, often scrolling through months of messages to find the key snippet of importance. Generally, text history is available in the way it was received.

Embodiments of the present invention recognize that efficiencies can be gained by providing the user with a method of tagging message content for easier retrieval. Implementation of embodiments of the invention may take a variety of forms, and exemplary implementation details are discussed subsequently with reference to the Figures.

Figure 1:
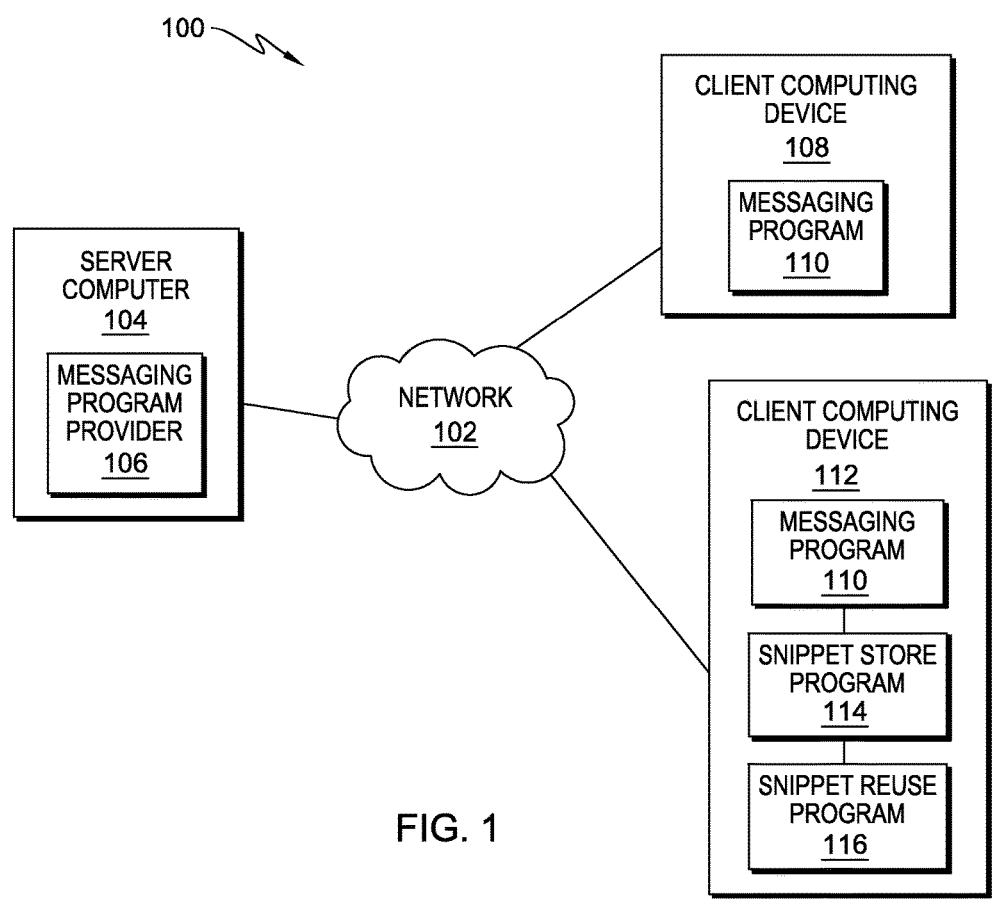
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, client computing device 108, and client computing device 112 interconnected over network 102. Network 102 can be, for example, a local area network (LAN), a wide area network (WAN), such as the Internet, or a combination of the two, and can include wired, wireless, or fiber optic connections. In general, network 102 can be any combination of connections and protocols that will support communications between server computer 104, client computing device 108, and client computing device 112.

Server computer 104 may be a management server, a web server, or any other electronic device or computing system capable of receiving and sending data. In other embodiments, server computer 104 may represent a server computing system utilizing multiple computers as a server system, such as in a cloud computing environment. In another embodiment, server computer 104 may be a laptop computer, a tablet computer, a netbook computer, a personal computer (PC), a desktop computer, a personal digital assistant (PDA), a smart phone, or any programmable electronic device capable of communicating with client computing device 108 and client computing device 112 via network 102. In another embodiment, server computer 104 represents a computing system utilizing clustered computers and components to act as a single pool of seamless resources. Server computer 104 includes messaging program provider 106.

Messaging program provider 106 is a service that provides messaging capability for client computing devices. Messaging program provider 106 provides the protocol for at least one of a plurality of messaging programs. An example of a messaging program provider is Short Message Service (SMS). SMS is a text messaging service component of phone, Web, or mobile communication systems. SMS uses standardized communications protocols to allow fixed line or mobile phone devices to exchange short text messages.

Client computing device 108 may be a desktop computer, a laptop computer, a tablet computer, a specialized computer server, a personal digital assistant, a smart phone, or any programmable electronic device capable of communicating with server computer 104 and client computing device 112 via network 102 and with various components and devices within distributed data processing environment 100. In general, client computing device 108 represents any programmable electronic device or combination of programmable electronic devices capable of executing machine readable program instructions and communicating with other computing devices via a network, such as network 102. Client computing device 108 includes messaging program 110.

Messaging program 110 is one of a plurality of programs that enable the exchange of text based messages between client computing devices, such as client computing device 108 and client computing device 112, via messaging program provider 106. In one embodiment, messaging program 110 is an email program through which users can exchange emails. For example, Lotus Notes® is an email program. In another embodiment, messaging program 110 may be an instant messaging program through which users can exchange instant messages. For example, Sametime® is an instant messaging program. In another embodiment, messaging program 110 may be a mobile phone text messaging program through which users can exchange text messages with mobile phones or smart phones.

Client computing device 112 may be a desktop computer, a laptop computer, a tablet computer, a specialized computer server, a personal digital assistant, a smart phone, or any programmable electronic device capable of communicating with server computer 104 and client computing device 108 via network 102 and with various components and devices within distributed data processing environment 100. In general, client computing device 112 represents any programmable electronic device or combination of programmable electronic devices capable of executing machine readable program instructions and communicating with other computing devices via a network, such as network 102. Client computing device 112 includes messaging program 110, as was discussed above with reference to client computing device 108. Client computing device 112 also includes snippet store program 114 and snippet reuse program 116. Client computing device 112 includes the capability of selecting and/or highlighting text on a display. Client computing device 112 may include internal and external hardware components, as depicted and described in further detail with respect to FIG. 4.

Snippet store program 114 enables a user to apply categories or tags to portions, or snippets, of an electronic message, allowing text to be saved in an organized manner. Snippet reuse program 116 enables a user to retrieve a saved snippet of a message for reuse in a new message. Snippet reuse program 116 also alerts a user that a snippet of previously saved text may relate to or be useful in a new message, based on recognition of the category or tag. Snippet store program 114 and snippet reuse program 116 may store and reuse, respectively, any media received or sent using instant protocols, for example, text, graphics and video. In one embodiment, snippet store program 114 and snippet reuse program 116 are stand alone programs. In another embodiment, snippet store program 114 and snippet reuse program 116 are features of messaging program 110. In yet another embodiment, snippet store program 114 and snippet reuse program 116 operate as one program performing the capabilities of each program. Snippet store program 114 is depicted and described in further detail with respect to FIG. 2. Snippet reuse program 116 is depicted and described in further detail with respect to FIG. 3.

Figure 2:
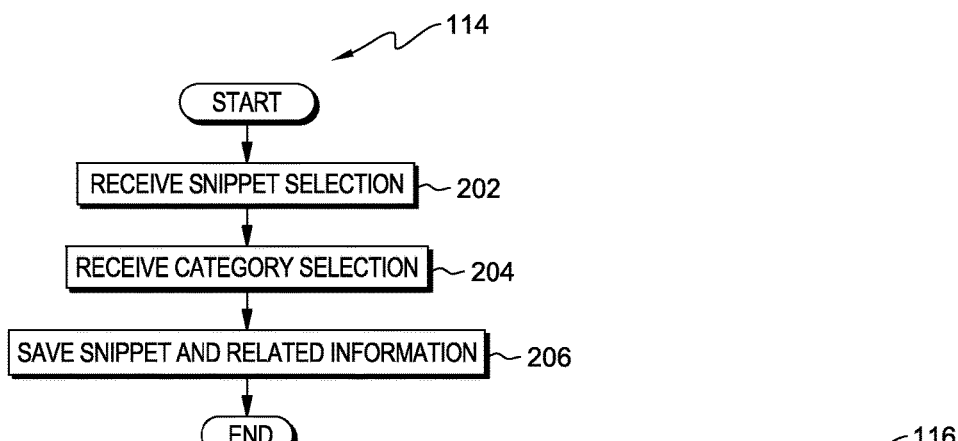
FIG. 2 is a flowchart depicting operational steps of a snippet store program, on a client computing device within the data processing environment of FIG. 1, for saving text snippets from messages, in accordance with an embodiment of the present invention.

FIG. 2 is a flowchart depicting operational steps of snippet store program 114, on client computing device 112 within data processing environment 100 of FIG. 1, for saving snippets from messages, in accordance with an embodiment of the present invention.

Snippet store program 114 receives a snippet selection (step 202). In one embodiment, a user of client computing device 112 receives an incoming text based message from client computing device 108 via messaging program 110. The user of client computing device 112 notes a snippet of text in the received message that is important to save. The snippet may include any or all of the text of the incoming message. The user highlights the snippet by using the protocol appropriate to client computing device 112. For example, if messaging program 110 is a cell phone text message program and client computing device 112 is a smart phone with a touch screen, the user may swipe the screen with a fingertip to highlight the snippet. In another example, if messaging program 110 is an instant message program and client computing device 112 is a laptop with an attached mouse, the user clicks and drags the mouse to highlight the snippet. Snippet store program 114 receives a user selection via the highlighted text.

Snippet store program 114 receives a category selection (step 204). Snippet store program 114 associates the selected snippet with a category. In an embodiment, snippet store program 114 associates selected text with a category based on the input of the user. Categories may include subject matter, sender name, and date received, among others. In another embodiment, snippet store program 114 associates selected text with a keyword within a category. A category may include one or more keywords. For example, if a category is "sports", keywords may include soccer, baseball, football, and golf. In one embodiment, a user may choose from a displayed list of categories. The list of categories may be pre-defined within snippet store program 114. The list of categories may be editable such that the user may input categories to snippet store program 114. In another embodiment, a category may be displayed as an icon on the screen of client computing device 112. The user clicks on or taps the selected category, and snippet store program 114 receives the category selection. In another embodiment, snippet store program 114 may apply real time semantics and known Natural Language Processing (NLP) techniques to the selected snippet and compare the snippet to a list of existing categories. The NLP techniques enable a mapping of various terms to categories, such that snippet store program 114 can analyze a snippet during categorization, and snippet store program 114 can offer good guesses of existing categories based on prior knowledge. Snippet store program 114 may use a ranking algorithm to determine which categories most closely relate to the snippet. The ranking algorithm may include a comparison threshold that a category meets in order to be offered by snippet store program 114. The mapping or knowledge may grow over time. In a further embodiment, snippet store program 114 may use NLP techniques to create or suggest a new category based on the content of the snippet. As will be appreciated by one skilled in the art, there exist a plurality of NLP techniques which can be utilized by snippet store program 114 to recognize the content of the selected snippet.

Snippet store program 114 saves the snippet and related information (step 206). In one embodiment, snippet store program 114 tags the snippet with the selected category and saves the snippet. Snippet store program 114 also saves identifying information related to the incoming original message. Related identifying information includes the date and time the message was received, the message sender, and the text of the original message. For example, a user receives a message regarding a board meeting of Charity ABC. The message from John Doe is received on Feb. 7, 2014 at 9:00 am. The message is several lines long, and includes the line, "The board meeting has been changed to Thursday at 7:00 pm." The user selects the snippet regarding the change to the board meeting and tags it with the category "Charity ABC". Snippet store program 114 saves the snippet as well as the sender's name, "John Doe", the date received, "2/7/2014", and the time received, "9:00 am", along with the original message under category "Charity ABC". The original message is saved for as long as the snippet is saved. Snippet store program 114 prevents the original message from being deleted as long as a saved snippet from the message exists. Snippet store program 114 may save multiple snippets from one message to one or more categories. Snippet store program 114 may also save one snippet to multiple categories. In one embodiment, snippet store program 114 stores the saved snippets and related information on client computing device 112. In another embodiment, snippet store program 114 may store the saved snippets and related information in the cloud, via network 102. In yet another embodiment, snippet store program 114 may store the saved snippets and related information on server computer 104.

Figure 3:
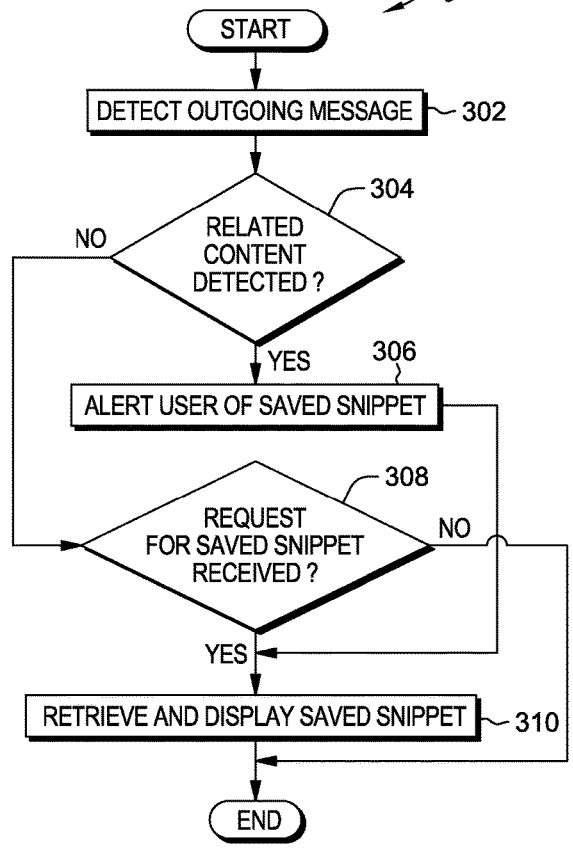
FIG. 3 is a flowchart depicting operational steps of a snippet reuse program, on a client computing device within the data processing environment of FIG. 1, for retrieving and reusing text snippets stored by the snippet store program of FIG. 2, in accordance with an embodiment of the present invention.

FIG. 3 is a flowchart depicting operational steps of snippet reuse program 116, on client computing device 112 within data processing environment 100 of FIG. 1, for retrieving and reusing snippets, in accordance with an embodiment of the present invention.

Snippet reuse program 116 detects an outgoing message (step 302). The user of client computing device 112 begins to compose an outgoing message via messaging program 110, and snippet reuse program 116 detects the text content of the message. Snippet reuse program 116 determines whether the text content detected in the outgoing message is related to any saved snippets (decision block 304). Related content includes snippets with a common subject, such as topic, sender name, and date sent. As discussed above, there exist a plurality of NLP techniques, such as filtering, which snippet reuse program 116 can utilize to recognize the text of the outgoing message and relate the text to a saved category or tag. In another embodiment, snippet reuse program 116 determines whether the text content detected in the outgoing message is related to any content in the received messages of the user, even if a saved snippet does not exist from the received messages.

If snippet reuse program 116 determines there is similar content detected (yes branch, decision block 304), snippet reuse program 116 alerts the user of a saved snippet (step 306). Snippet reuse program 116 alerts the user that a tag exists that relates to the content of the outgoing message. In one embodiment, snippet reuse program 116 alerts the user by emitting an audible sound. In another embodiment, snippet reuse program 116 may alert the user by displaying the category as flashing text on the screen of client computing device 112. For example, the user begins an outgoing message that includes the text "Charity ABC". By using known filtering techniques, snippet reuse program 116 determines that a snippet is saved in a category called "Charity ABC", and alerts the user by flashing "Charity ABC" on the screen. In another embodiment, snippet reuse program 116 displays the category in a pop up window on the screen. Snippet reuse program 116 may display more than one category for the user to choose from if, by using known filtering techniques, snippet reuse program 116 finds more than one related snippet. In one embodiment, snippet reuse program 116 is continually running and alerts the user each time related text is detected. In another embodiment, the user may initiate and disable snippet reuse program 116 such that alerts are received at the discretion of the user.

If snippet reuse program 116 determines there is no similar content detected (no branch, decision block 304), snippet reuse program 116 determines whether a request for a saved snippet is received (decision block 308). In one embodiment, a user is composing an outgoing message and remembers that a related snippet is saved. The user selects the category under which the snippet is saved and scans the snippets in that category for the related snippet. Snippet reuse program 116 receives the request for a saved snippet as the user selects the related snippet (yes branch, decision block 308). For example, a user wants to inform a friend of the changes to the Charity ABC board meeting. As the user composes a text message to the friend, the user selects the category "Charity ABC" and selects the snippet "The board meeting has been changed to Thursday at 7:00 pm." If the user does not request saved text (no branch, decision block 308), snippet reuse program 116 ends, and the user completes the outgoing message.

Subsequent to alerting a user of a saved snippet or receiving a request for a saved snippet, snippet reuse program 116 retrieves and displays the saved snippet (step 310). In one embodiment, snippet reuse program 116 displays the tagged snippet within the text of the outgoing message for reuse. In another embodiment, snippet reuse program 116 displays the tagged snippet in a pop up window from which the user can select it. Continuing the previous example, snippet reuse program 116 displays "The board meeting has been changed to Thursday at 7:00 pm" within the text of the outgoing message, enabling the user to efficiently communicate the information about the meeting to the friend. If the user does not want to include the entire snippet in the outgoing message, the user may edit the snippet using standard text editing techniques.

Figure 4:
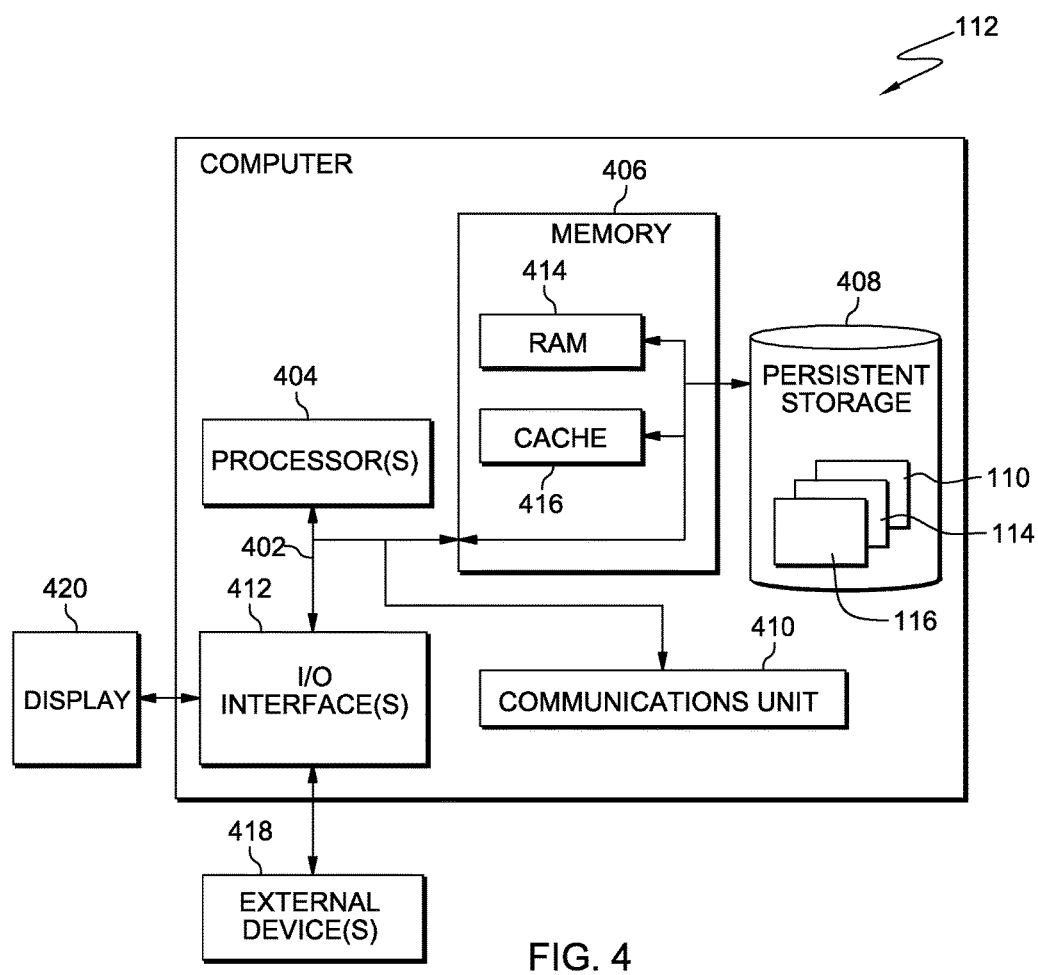
FIG. 4 depicts a block diagram of components of the client computing device executing the snippet store program and the snippet reuse program, in accordance with an embodiment of the present invention.

FIG. 4 depicts a block diagram of components of client computing device 112 executing the snippet store program and the snippet reuse program, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Client computing device 112 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Messaging program 110, snippet store program 114, and snippet reuse program 116 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server computer 104 and client computing device 108. In these examples, communications unit 410 includes one or more network interface cards. Communications unit 410 may provide communications through the use of either or both physical and wireless communications links. Messaging program 110, snippet store program 114, and snippet reuse program 116 may be downloaded to persistent storage 408 through communications unit 410.

I/O interface(s) 412 allows for input and output of data with other devices that may be connected to client computing device 112. For example, I/O interface(s) 412 may provide a connection to external device(s) 418 such as a keyboard, a keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., messaging program 110, snippet store program 114, and snippet reuse program 116, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by one or more computer processors, an original message, wherein the original message includes at least one snippet;
   storing, by the one or more computer processors, the original message;
   creating, by the one or more computer processors, a first category associated with the stored original message and with the at least one snippet, wherein the first category includes one or more keywords, and wherein creating the first category associated with the stored original message and with the snippet includes using one or more natural language processing techniques on the stored original message;
   tagging, by the one or more computer processors, the stored original message and the at least one snippet with the associated first category for efficient retrieval of the stored original message;
   detecting, by the one or more computer processors, an outgoing message created by a user;
   determining, by the one or more computer processors, whether a portion of the outgoing message is associated with the one or more keywords of the first category;
   responsive to determining a portion of the outgoing message is associated with the one or more keywords of the first category, alerting, by the one or more computer processors, the user of the stored original message and the at least one snippet associated with the first category;
   retrieving, by the one or more computer processors, the stored original message and the at least one snippet associated with the first category; and
   inserting, by the one or more computer processors, the stored original message and the at least one snippet associated with the first category within a text of the outgoing message.

2. The method of claim 1, wherein alerting the user of the stored original message and the at least one snippet associated with the first category comprises emitting an audible sound, inserting the related message content into the outgoing message, displaying flashing text, and displaying a pop up window.

3. The method of claim 1, further comprising:
   determining, by the one or more computer processors, whether content related to the outgoing message is stored;
   responsive to determining, by the one or more computer processors, that content related to the outgoing message is not stored, determining, by the one or more computer processors, whether a request for stored message content is received;
   responsive to determining, by the one or more computer processors, a request for stored message content is received, retrieving, by the one or more computer processors, the stored message content; and
   reusing, by the one or more computer processors, the stored message content in the outgoing message.

4. The method of claim 1, wherein the stored original message includes one or more of text, graphics and video.

5. The method of claim 1, further comprising:
   receiving, by one or more computer processors, a selection of message content by the user from an incoming message;
   creating, by the one or more computer processors, a second category associated with the selected message content, wherein creating the second category associated with the selected message content includes using one or more natural language processing techniques;
   receiving, by the one or more computer processors, a selection of the second category associated with the selected message content from the user;
   tagging, by the one or more computer processors, the selected message content with the selected second category; and
   storing, by the one or more computer processors, the selected message content associated with the selected second category.

6. The method of claim 1, further comprising, preventing, by the one or more computer processors, deletion of an original message associated with at least one snippet.

7. The method of claim 5, wherein storing the selected message content further comprises storing, by the one or more computer processors, identifying information related to the selected message content, wherein identifying information related to the selected message content includes at least one of a message sender, a date of message receipt, an original message content, and at least one portion of the original message content.

8. A computer program product comprising:
one or more computer readable storage devices and program instructions stored on the one or more computer readable devices, wherein the computer readable storage device is hardware, the stored program instructions comprising:
program instructions to receive an original message, wherein the original message includes at least one snippet;
program instructions to store the original message;
program instructions to create a first category associated with the stored original message and with the at least one snippet, wherein the first category includes one or more keywords, and wherein creating the first category associated with the stored original message and with the at least one snippet includes using one or more natural language processing techniques on the stored original message;
program instructions to tag the stored original message and the at least one snippet with the associated first category for efficient retrieval of the stored original message;
program instructions to detect an outgoing message created by a user;
program instructions to determine whether a portion of the outgoing message is associated with the one or more keywords of the first category;
responsive to determining a portion of the outgoing message is associated with the one or more keywords of the first category, program instructions to alert the user of the stored original message and the at least one snippet associated with the first category;
program instructions to retrieve the stored original message and the at least one snippet associated with the first category; and
program instructions to insert the stored original message and the at least one snippet associated with the first category within a text of the outgoing message.

9. The computer program product of claim 8, wherein program instructions to alert the user of the stored original message and the at least one snippet associated with the first category comprises emitting an audible sound, inserting the related message content into the outgoing message, displaying flashing text, and displaying a pop up window.

10. The computer program product of claim 8, further comprising:
program instructions to determine whether content related to the outgoing message is stored;
responsive to determining that content related to the outgoing message is not stored, program instructions to determine whether a request for stored message content is received;
responsive to determining a request for stored message content is received, program instructions to retrieve the stored message content; and
program instructions to reuse the stored message content in the outgoing message.

11. The computer program product of claim 8, the stored program instructions further comprising:
program instructions to receive a selection of message content by the user from an incoming message;
program instructions to create a second category associated with the selected message content, wherein program instructions to create the second category include program instructions to use one or more natural language processing techniques;
program instructions to receive a selection of the second category associated with the selected message content from the user;
program instructions to tag the selected message content with the selected second category; and
program instructions to store the selected message content associated with the selected second category.

12. The computer program product of claim 11, the stored program instructions further comprising, program instructions to prevent deletion of an original message associated with the selected message content.

13. A computer system comprising:
one or more computer processors;
one or more computer readable storage media;
program instructions stored on the computer readable storage media for execution by at least one of the one or more processors, the stored program instructions comprising:
program instructions to receive an original message, wherein the original message includes at least one snippet;
program instructions to store the original message;
program instructions to create a first category associated with the stored original message and with the at least one snippet, wherein the first category includes one or more keywords, and wherein creating the first category associated with the stored original message and with the at least one snippet includes using one or more natural language processing techniques on the stored original message;
program instructions to tag the stored original message and the at least one snippet with the associated first category for efficient retrieval of the stored original message;
program instructions to detect an outgoing message created by a user;
program instructions to determine whether a portion of the outgoing message is associated with the one or more keywords of the first category;
responsive to determining a portion of the outgoing message is associated with the one or more keywords of the first category, program instructions to alert the user of the stored original message and the at least one snippet associated with the first category;
program instructions to retrieve the stored original message and the at least one snippet associated with the first category; and
program instructions to insert the stored original message and the at least one snippet associated with the first category within a text of the outgoing message.

14. The computer system of claim 13, wherein program instructions to alert the user of the stored original message and the at least one snippet associated with the first category comprises emitting an audible sound, inserting the related message content into the outgoing message, displaying flashing text, and displaying a pop up window.

15. The computer system of claim 13, further comprising:
program instructions to determine whether content related to the outgoing message is stored;
responsive to determining that content related to the outgoing message is not stored, program instructions to determine whether a request for stored message content is received;

responsive to determining a request for stored message content is received, program instructions to retrieve the stored message content; and program instructions to reuse the stored message content in the outgoing message.

16. The computer system of claim 13, the stored program instructions further comprising:

program instructions to receive a selection of message content by the user from an incoming message;

program instructions to create a second category associated with the selected message content, wherein program instructions to create the second category include program instructions to use one or more natural language processing techniques;

program instructions to receive a selection of the second category associated with the selected message content from the user;

program instructions to tag the selected message content with the selected second category; and program instructions to store the selected message content associated with the selected second category.

17. The computer system of claim 16, the stored program instructions further comprising, program instructions to prevent deletion of an original message associated with the selected message content.

* * * * *